United States Patent
Tamma et al.

(10) Patent No.: US 9,385,909 B2
(45) Date of Patent: Jul. 5, 2016

(54) DETECTING REPEATED PREAMBLE SYMBOLS USING OVER-SIZED DISCRETE FOURIER TRANSFORMS

(71) Applicant: FREESCALE SEMICONDUCTOR, INC., Austin, TX (US)

(72) Inventors: Raja V. Tamma, Leander, TX (US); Kevin Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/048,172

(22) Filed: Oct. 8, 2013

(65) Prior Publication Data

US 2015/0098530 A1 Apr. 9, 2015

(51) Int. Cl.
*H04L 27/26* (2006.01)
*H04L 1/00* (2006.01)
*H04L 1/08* (2006.01)
*H04L 29/08* (2006.01)

(52) U.S. Cl.
CPC ............ *H04L 27/265* (2013.01); *H04L 1/0039* (2013.01); *H04L 1/08* (2013.01); *H04L 27/2613* (2013.01); *H04L 67/12* (2013.01)

(58) Field of Classification Search
CPC .............. H04B 1/7093; H04L 27/2666; H04L 27/2675; H04L 5/0094; H04L 27/265; H04L 1/0039; H04L 27/2613; H04L 67/12; H04L 1/08; H01Q 1/1257; H04W 72/02; H04W 72/0453
See application file for complete search history.

(56) References Cited

U.S. PATENT DOCUMENTS

| | | | |
|---|---|---|---|
| 7,203,245 B1 | 4/2007 | Murphy | |
| 7,257,165 B2 | 8/2007 | Gardner | |
| 7,280,621 B1 | 10/2007 | Murphy | |
| 7,606,139 B2 | 10/2009 | Bick et al. | |
| 8,160,169 B1* | 4/2012 | Lee et al. | 375/260 |
| 8,374,264 B2* | 2/2013 | Kobayashi et al. | 375/260 |
| 8,442,141 B1* | 5/2013 | Zhang et al. | 375/267 |
| 8,516,350 B2* | 8/2013 | Gaal | H04L 5/0094 714/784 |
| 8,918,110 B2* | 12/2014 | Choi | H04J 11/0069 370/350 |
| 9,008,050 B2* | 4/2015 | Feuersanger et al. | 370/336 |
| 2005/0259568 A1* | 11/2005 | Yeh et al. | 370/208 |
| 2007/0279196 A1* | 12/2007 | Macaluso | H04B 3/54 375/260 |
| 2009/0323511 A1* | 12/2009 | Murali | H04L 27/2675 370/210 |
| 2010/0027604 A1 | 2/2010 | Vaidyanathan et al. | |
| 2010/0158050 A1* | 6/2010 | Yang | 370/498 |
| 2011/0013729 A1* | 1/2011 | Yuba et al. | 375/329 |
| 2013/0077610 A1* | 3/2013 | Amini et al. | 370/338 |
| 2013/0102254 A1* | 4/2013 | Cyzs et al. | 455/63.1 |
| 2014/0056249 A1* | 2/2014 | Park et al. | 370/329 |
| 2014/0146900 A1* | 5/2014 | Dabak et al. | 375/257 |

FOREIGN PATENT DOCUMENTS

| | | |
|---|---|---|
| EP | 2 259 525 A2 | 8/2010 |
| WO | 2008114216 A2 | 9/2008 |
| WO | 2009101606 A2 | 8/2009 |

\* cited by examiner

*Primary Examiner* — Hirdepal Singh

(57) ABSTRACT

A technique for detecting symbols includes performing an over-sized discrete Fourier transform (DFT) operation on a received signal that includes at least two repeated symbols. A sum of signal characteristics for subcarriers of one or more possible symbols are determined based on the DFT operation. A sum of signal characteristics for non-subcarriers of the one or more possible symbols is determined based on the DFT operation. Finally, a determination is made as to whether one or more of the one or more possible symbols is detected based on the sum of signal characteristics for the subcarriers and sum of signal characteristics for the non-subcarriers.

20 Claims, 4 Drawing Sheets

DETECTING REPEATED PREAMBLE SYMBOLS USING OVER-SIZED DISCRETE FOURIER TRANSFORMS

BACKGROUND

1. Field

This disclosure relates generally to communication systems and, more specifically, to detecting orthogonal frequency-division multiplexing and discrete multi-tone symbols, that are repeated multiple times by concatenating multiple copies of a unique orthogonal frequency-division multiplexing or discrete multi-tone symbol end-to-end without using cyclic prefixes, by using over-sized discrete Fourier transforms.

2. Related Art

Orthogonal frequency-division multiplexing (OFDM) refers to an approach to encode digital data on multiple carrier frequencies. OFDM, which may be deployed in wireless or wired applications, has become a popular technology for digital communication systems. OFDM is employed in a wide variety of applications, e.g., digital television and digital audio broadcasting, digital subscriber line (DSL) broadband Internet access, and fourth generation (4G) mobile communications. OFDM modulation is similar to discrete multi-tone (DMT) modulation and employs frequency-division multiplexing (FDM) as a digital multi-carrier modulation process.

In OFDM, a number of closely spaced orthogonal subcarriers are used to carry data on several channels in parallel. Each subcarrier is modulated with a conventional modulation scheme (e.g., quadrature amplitude modulation (QAM) and phase-shift keying (PSK)) at a relatively low symbol rate, while maintaining total data rates similar to conventional single-carrier modulation schemes that utilize a similar bandwidth. A primary advantage of OFDM implementations over single-carrier approaches is the ability of OFDM to cope with severe channel conditions (e.g., attenuation of high frequencies in a copper conductor, narrowband interferences, and frequency-selective fading due to multi-path interference) without implementing complex equalization filters.

Power-line communication (PLC) refers to transmitting data on an electrical conductor that is also used simultaneously for alternating current (AC) electric power transmission to consumers. A wide range of PLC technologies may be deployed for different applications, ranging from home automation to Internet access. Most PLC technologies are limited to premises wiring within a single building or a distribution network wiring, but some PLC technologies can be implemented in both distribution network wiring and premises wiring. Typically, multiple PLC technologies are required to form relatively large networks. PLC technologies may provide different data rates and utilize different frequencies for different applications.

Several PLC channels may be coupled onto one high-voltage (HV) line. Filtering devices are usually applied at substations to prevent the carrier frequency current from being bypassed through the station apparatus and to ensure that distant faults do not affect the isolated segments of a PLC system. Narrowband PLC works at frequencies from 3-500 kHz, data rates up to 100s of kbps, and has a range up to several kilometers which can be extended using repeaters. Broadband PLC works at higher frequencies (1.8-250 MHz), higher data rates (up to 100s of Mbps) and is used in shorter-range applications. Recently, narrowband PLC has been receiving widespread attention due to its applications in the Smart Grid. Narrowband PLC has also been used in smart energy generation, particularly in micro-inverters for solar panels. Narrowband PLC standards include G3-PLC (36-90.6 kHZ), PRIME (42-89 kHZ), IEEE 1901.2 (9-500 kHZ), ANSI/EIA 709.1, .2 (86 kHz, 131 kHZ), KNX (125-140 kHZ), and IEC61334 (CENELEC-A). Broadband PLC, in contrast, has mainly found acceptance as a last-mile solution for Internet distribution and home networking. With high data rates and no additional wiring, broadband PLC is seen as an effective technology for multimedia distribution within homes.

In general, smart meters are configured to gather data for remote reporting to a central station using two-way communication. In a typical installation, a smart meter may communicate with a central station over a power-line using a differential demodulation technique with forward-error correction (FEC). The term 'smart meter' may be used to refer to various devices that measure utilities, such as electricity, natural gas, and water consumption. Smart meters usually implement real-time or near real-time sensors and may facilitate power outage notification. Smart meters may also facilitate measuring site-specific information, allowing price setting agencies to introduce different prices for consumption based on the time of day and the season. Smart meters may also measure surge voltages and harmonic distortion, allowing diagnosis of power quality problems.

Smart meters generally help consumers better manage their energy use based on up-to-date information on gas, water, and electricity consumption and in doing so help people reduce energy bills and carbon emissions. Electricity pricing usually peaks at certain predictable times of the day and the season. In particular, if generation is constrained, prices can rise if power from other jurisdictions or more costly generation is brought online. Implementing smart meters allows consumers to adjust their consumption habits to be more responsive to market prices, which may delay the construction of additional generation or at least the purchase of energy from higher priced sources.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
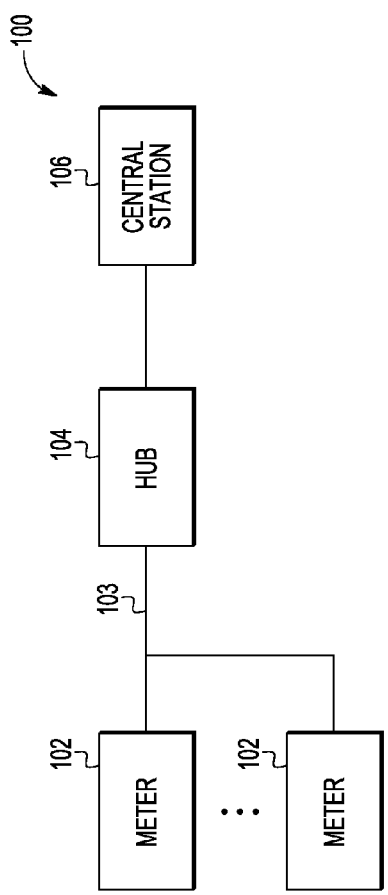
FIG. 1 is a block diagram of a relevant portion of a communication system that is configured to detect orthogonal frequency-division multiplexing (OFDM) or discrete multi-tone (DMT) symbols, that are repeated multiple times by concatenating multiple copies of a unique symbol end-to-end without cyclic prefixes, using an over-sized discrete Fourier transform (DFT) according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. For example, a receiver configured according to the present disclosure may be implemented in a wired or wireless communication system. The following detailed description is, therefore, not to be taken in a limiting sense, and the scope of the present invention is defined only by the appended claims and their equivalents. As may be used herein, the term 'coupled' encompasses a direct electrical connection between elements or components and an indirect electrical connection between elements or components achieved using one or more intervening elements or components.

As used herein, the term 'over-sized discrete Fourier transform (DFT)' means that a size of a DFT operation performed on a repeated symbol at a receiver is always greater than a size of an inverse DFT (IDFT) used to form the symbol at a transmitter. For example, when an IDFT of size 'N' is employed to form a preamble symbol that is repeated 'K' times (where 'K' is greater than or equal to two) at a transmitter, a receiver will perform a PN-DFT operation, where 'P' is greater than or equal to two and less than or equal to 'K'. As one example, for 'K' equal to three, 'P' can be equal to two or three.

According to one or more embodiments of the present disclosure, time-domain correlation or frequency-domain correlation is not utilized for initial preamble symbol detection. In general, correlation of two vectors involves computing their dot product. For example, to detect the presence of vector 'A' in a noisy vector 'B', the vectors may be correlated, i.e., A·B* (where 'B*' is the complex conjugate of 'B') may be computed and compared against a known threshold. According to one or more embodiments of the present disclosure, to detect several vectors $A_0, A_1, \ldots$ in the noisy vector 'B' the detection of the presence of any $A_i$ vector is found by examining the frequency spectrum of the signal and not by computing $A_i \cdot B^*$. If and when the presence of any $A_i$ is detected, correlation may be employed to ascertain which particular $A_i$ is present. The disclosed techniques provide an efficient implementation without an increase in complexity and are applicable to the detection of preambles that include repetitions of a known symbol or symbols (e.g., orthogonal frequency-division multiplexing (OFDM) or discrete multitone (DMT) symbols) attached end-to-end without cyclic prefixes that are frequently employed to facilitate burst detection and synchronization in communication systems (e.g., power-line communication (PLC) systems).

In applications that require simultaneous detection of multiple OFDM or DMT signal preambles (with each preamble using a different set of subcarriers), employing traditional time-domain or frequency-domain correlation approaches may significantly increase complexity of preamble detection.

Moreover, in applications that require simultaneous detection of multiple OFDM or DMT signal preambles that each use a same set of subcarriers but with different preamble symbols mapped on to each of the subcarriers, employing traditional time-domain correlation or frequency-domain correlation approaches may also significantly increase preamble detection complexity. Additionally, in applications that require simultaneous detection of multiple OFDM or DMT signal preambles with overlap between sets of subcarriers of different OFDM or DMT signal preambles, employing traditional time-domain or frequency-domain correlation approaches may also significantly increase preamble detection complexity.

According to one or more embodiments of the present disclosure, efficient techniques for detecting preamble symbols are disclosed that do not significantly increase preamble detection complexity when performing simultaneous detection of multiple OFDM or DMT signal preambles. In one or more embodiments, the disclosed techniques include: performing an over-sized discrete Fourier transform (DFT) operation, e.g., an over-sized fast Fourier transform (FFT) operation, on a received signal that includes at least two repeated preamble symbols; calculating a sum of energies of subcarriers (or bins) occupied by the preamble symbol; calculating a sum of the energies of all remaining subcarriers (or bins) or some of the remaining subcarriers that are not subcarriers of the repeated preamble symbol; and testing a ratio of the two sums against a threshold to determine if the preamble is detected. For example, assuming 'N' is the size of an inverse fast Fourier transform (IFFT) used to generate a repeated symbol and the symbol is repeated 'P' times, an FFT up to PN size (e.g., an FFT of 2N, . . . , PN) may be employed. For example, if a symbol of size 'N' is repeated four times in a burst, a 2N-FFT, a 3N-FFT, or a 4N-FFT may be used to detect the burst.

According to one or more embodiments of the present disclosure, a technique for detecting symbols in a communication system using over-sized discrete Fourier transforms includes performing an over-sized discrete Fourier transform (DFT) operation on a received signal that includes at least two repeated symbols. The technique also includes determining a sum of signal characteristics (e.g., energies or amplitudes) for subcarriers of one or more possible symbols based on the DFT operation and determining a sum of signal characteristics (e.g., energies or amplitudes) for non-subcarriers of the one or more possible symbols based on DFT operation. The technique also includes determining whether one or more of the one or more possible symbols is detected based on the sum of signal characteristics (e.g., energies or amplitudes) for the subcarriers and sum of signal characteristics (e.g., energies or amplitudes) for the non-subcarriers.

As is known, an OFDM symbol may be formed by computing an IFFT of a sequence of modulation (e.g., phase-shift keying (PSK), quadrature amplitude modulation (QAM), etc.) symbols that are mapped onto a set of subcarriers. A size of the IFFT is determined by the spacing between consecutive subcarriers and the sampling frequency. For example, an IFFT size doubles if the spacing is halved and the frequency resolution of the signal is doubled. In general, standards define the smallest feasible FFT/IFFT size in the transmitter specifications. Assuming $F_s$ is a minimum sampling frequency required to maintain subcarrier orthogonality and 'N' is an associated number of samples in the preamble symbol, an N-sized FFT is required to provide a frequency-domain representation of received signal. According to aspects of the present disclosure, an over-sized FFT is employed while keeping the sampling frequency the same. For example, to implement a PN-FFT, a time-domain sample sequence is required that includes 'P' full preamble symbols. When the FFT size is doubled, the frequency resolution is also doubled and the signal spectrum may be calculated with one-half of the original subcarrier spacing.

With reference to FIG. 1, an exemplary communication system 100 is illustrated that includes a plurality of smart meters 102 that are configured, according to one or more embodiments of the present disclosure, to detect received preamble symbols. Communication system 100 also includes a hub 104 that is coupled to meters 102 via a power-line 103. The hub 104 and the meters 102 may be coupled to the power-line 103 via, for example, direct electrical connections. As is illustrated in FIG. 1, the hub 104 is coupled (e.g., via a direct electrical connection) to a central station 106, which may include hardware accelerators for performing some or all of the disclosed functions, or one or more processors (each of which may include one or more processor cores) coupled to a storage subsystem, which may include, for example, application appropriate amounts of memory (e.g., dynamic random access memory (DRAM), static RAM (SRAM), and/or read-only memory (ROM)), and/or one or more mass storage devices, such as magnetic media (tape or disk) drives and/or optical disk drives. The hub 104 and the central station 106 may also be configured, according to one or more embodiments of the present disclosure, to detect received preamble symbols.

As used herein, a 'hub' is a device that couples multiple communication devices together to form a single network segment. In general, a hub has multiple input/output (I/O) ports, in which a signal introduced at an input of any port appears at an output of every port except the original incoming port. A hub may participate in collision detection, forwarding a jam signal to all ports if a collision is detected. The central station 106 may perform various functions. For example, the central station 106 may log periodic readings (e.g., gas, water, and/or electricity readings) provided from the meters 102 to facilitate customer billing and/or control on-demand power capacity.

Figure 2:
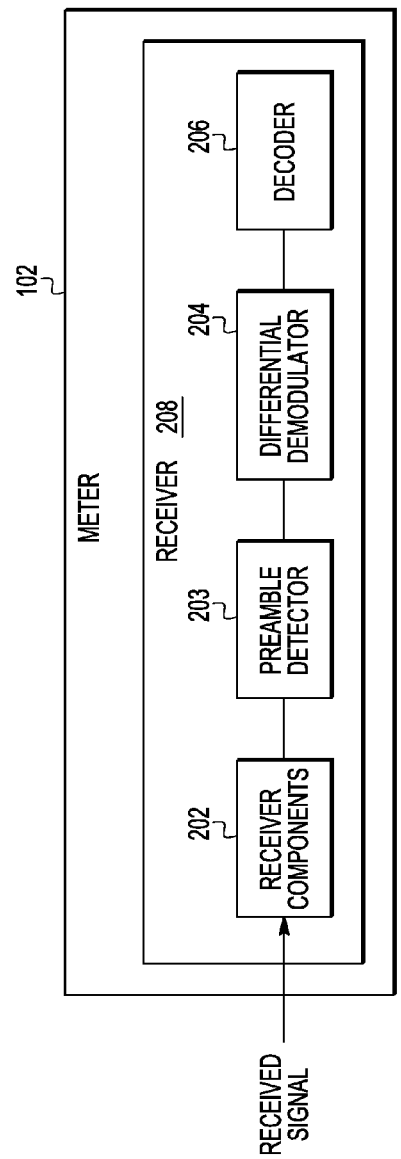
FIG. 2 is a block diagram of a relevant portion of an exemplary smart meter that may be employed in the communication system of FIG. 1.

With reference to FIG. 2, an exemplary smart meter 102 is illustrated that may be coupled to power-line 103 via a direct electrical connection. The meter 102 is illustrated as including a receiver 208 that includes various receiver components 202, a preamble detector 203, a differential demodulator 204, and a decoder 206. For example, the receiver components 202 may include a band-pass filter (BPF), a radio frequency (RF) amplifier, a frequency converter, and a low-pass (LP) filter. The BPF reduces strong out-of-band signals and image frequency response. The RF amplifier is implemented to increase the sensitivity of the receiver 208 by amplifying weak received signals without contaminating the received signals with noise. In general the RF amplifier can be omitted (or switched off) for frequencies below 30 MHz, where signal-to-noise ratio (SNR) is defined by atmospheric and man-made noise. The frequency converter is configured to down-convert a received signal to an intermediate frequency (IF) and the LP filter is utilized to reject frequencies above the IF.

The preamble detector 203 performs preamble detection and synchronization. The differential demodulator 204 is configured to differentially demodulate a received signal. The decoder 206 is configured to decode the demodulated signal and may, for example, be implemented as a Viterbi decoder. It should be appreciated that components of the receiver 208 that are not deemed desirable for understanding the disclosed subject matter have been omitted for brevity. It should be understood that meter 102 also includes a transmitter and other components, which have also been omitted for brevity.

Figure 3:
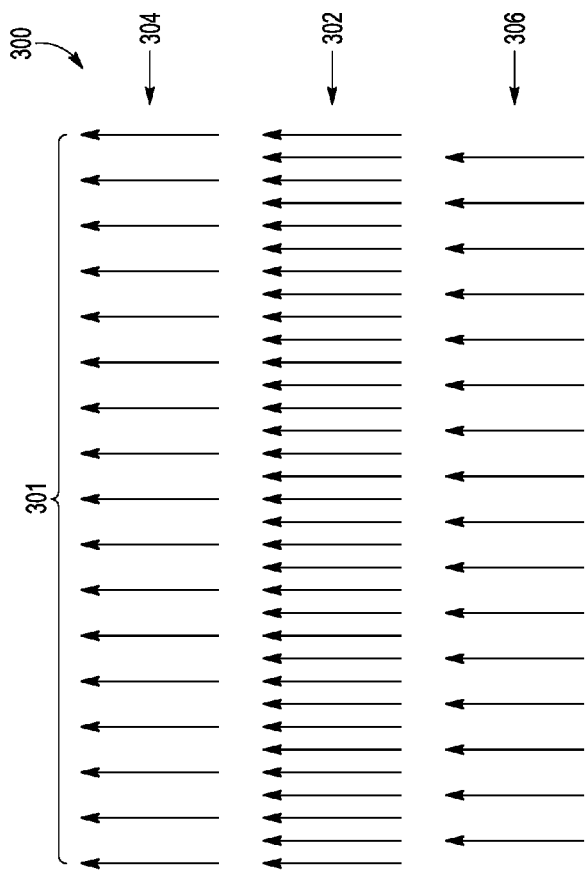
FIG. 3 is a diagram of a relevant portion of an exemplary frequency band that illustrates the use of over-sized discrete Fourier transforms according to an embodiment of the present invention.

With reference to FIG. 3, an exemplary diagram 300 depicts various subcarriers within a frequency band 301 of interest. Subcarriers 302 represent subcarriers provided by a 2N-FFT of the frequency band 301. Subcarriers 304 represent subcarriers of one or more possible symbols. Subcarriers 306 represent subcarriers that are not subcarriers of one or more possible symbols. For example, subcarriers 304 may be subcarriers specified for use in preamble symbols defined by one or more of G3-PLC, PRIME, IEEE 1901.2, ANSI/EIA 709.1, 709.2, KNX, and IEC61334. In general, non-subcarriers are subcarriers that are not defined by, for example, G3-PLC, PRIME, IEEE 1901.2, ANSI/EIA 709.1, 709.2, KNX, and IEC61334. As noted above, non-preamble symbol subcarriers may be chosen to be completely within a frequency band of a preamble symbol, outside the frequency band, or a combination of both.

Figure 4:
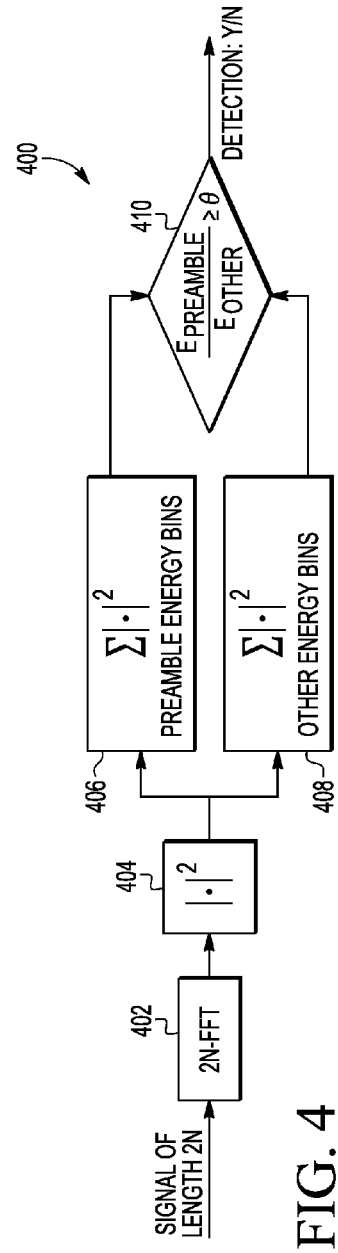
FIG. 4 is a diagram of an exemplary detection process for employing an over-sized DFT, e.g., an fast Fourier transform (FFT), to detect repeated preamble symbols according to an embodiment of the present invention.

With reference to FIG. 4, an exemplary detection process 400 for employing an over-sized fast Fourier transform (FFT) to detect repeated preamble symbols is illustrated in block form. Process 400 may be implemented in, for example, the preamble detector 203, which may be implemented in hardware (e.g., in an application specific integrated circuit (ASIC) or a field-programmable gate array (FPGA)) or using a combination of hardware and software (e.g., using a programmed general purpose processor or a programmed digital signal processor (DSP)). In FIG. 4, an FFT block 402 receives a signal of length (size) 2N. The FFT block 402 provides amplitudes for a number of subcarriers (some of which are subcarriers of the received signal) to an energy block 404. The energy block 404 squares the amplitudes for each of the subcarriers to provide an energy value for each of the subcarriers. The energy value for each of the subcarriers is then provided to an appropriate one of preamble energy bins block 406 or non-preamble energy bins (other energy bin) block 408 for summing That is, subcarriers that are assigned to a preamble symbol for which detection is being attempted are assigned to block 406 and the subcarriers that are not assigned to the preamble symbol for which detection is being attempted are assigned to block 408.

In block 406, the energies for the subcarriers that are assigned to a preamble symbol for which detection is being attempted are summed. In block 408, the energies for the subcarriers that are not assigned to a preamble symbol for which detection is being attempted are summed. In block 410 a determination is made as to whether the preamble symbol for which detection is attempted is detected, e.g., by comparing a ratio of the summed subcarrier energy for the preamble symbol over the summed subcarrier energy for subcarriers that are not associated with the preamble symbol to a threshold. When the threshold is exceeded, detection is indicated and demodulation may be performed. It should be appreciated that when the threshold is not exceeded, detection is not indicated and demodulation is not performed.

For example, a threshold is generally dependent on the frequency spectra of all the preamble symbols that are being simultaneously searched for, as well as the size of FFT used. Typically, energies in all subcarrier bins associated with the preamble symbol may be summed. However, if there is an overlap among subcarriers used in multiple preamble symbols, different non-overlapping sets of subcarriers may be used for calculating energies in the preamble symbol bins. It should be appreciated that the choice is even more diverse for non-preamble symbol subcarriers. For example, non-preamble symbol subcarriers may be chosen to be completely within a frequency band, outside the frequency band, or a combination of both. In general, the sets of subcarriers used to calculate $E_{preamble}$ and $E_{other}$ need to be determined by performance analysis through simulations. As an one example, if $E_{preamble}$ uses all preamble bins and $E_{other}$ uses all non-preamble bins (but only those within the signal band), the ratio may be approximately 2.0

Figures 5, 6:
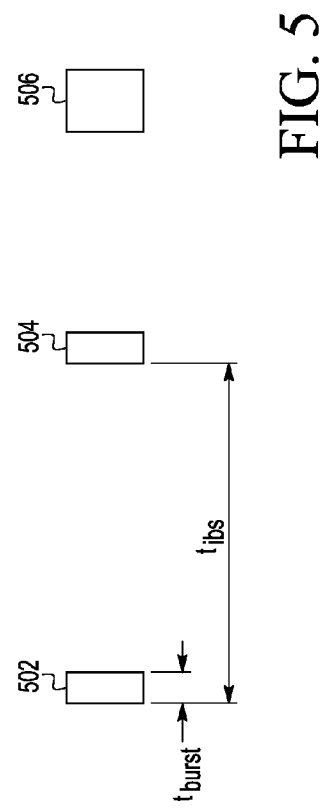
FIG. 5 is an exemplary diagram that depicts a number of bursts that arrive at a receiver over random intervals.
FIG. 6 is a table that depicts multiply-accumulate (MAC) complexity of conventional time-domain correlation, conventional frequency-domain correlation, and over-sized DFT symbol detection according to the present invention for searching one preamble symbol and searching 'M' preamble symbols simultaneously.

With reference to FIG. 5, a diagram 500 depicts a number of bursts 502, 504, 506, and 508 (at least one of which is a different size than the other bursts) that are arriving at a receiver at a relatively slow rate and at random intervals. Typically, a burst time $t_{burst}$ is much less than an interval between bursts $t_{ibs}$. When the burst time $t_{burst}$ is much less than the interval between bursts $t_{ibs}$, a receiver spends most of the time searching for a preamble and, as such, the disclosed techniques may provide significant power consumption savings. The disclosed techniques can simultaneously detect multiple OFDM/DMT preamble signals while keeping the computational complexity practically the same as detecting a single OFDM/DMT preamble signal. It should be appreciated that when the presence of a preamble symbol is detected, correlation in the frequency-domain with all possible preamble symbols may be required to determine an actual preamble symbol present. However, correlation in the frequency-domain with all possible preamble symbols is usually only applicable when all OFDM/DMT signals employ the same set of subcarriers.

As noted above, the disclosed techniques employ oversized FFTs (the size of which is a multiple of the size of the FFT used to originally generate a received OFDM symbol and is governed by the number of repetitions of the preamble symbol) for detection and uses correlation sparingly. In general, the disclosed techniques may significantly reduce implementation complexity while simultaneously detecting multiple OFDM preambles. The disclosed techniques may, for example, be deployed in smart meters, hubs, and central stations, to facilitate using different preamble symbols for different applications.

With reference to FIG. 6, a table 600 provides a comparison of the computational complexity (in terms of multiply-accumulate (MAC) operations) between traditional detection approaches based on time-domain and frequency-domain correlation and the disclosed techniques. In FIG. 6, 'N' is the size of each preamble symbol which is repeated a number of times, 'M' is the number of preambles being searched simultaneously, and 'L' is the number of sample offsets being searched simultaneously. As is illustrated, using time-domain correlation to search for one preamble has a MAC complexity of 'N' and using time-domain correlation to search for 'M' preambles simultaneously has a MAC complexity of MN. Using frequency-domain correlation to search for one preamble has a MAC complexity of $(2N/L)\log_2 N$ and using frequency-domain correlation to search for 'M' preambles simultaneously has a MAC complexity of $(2MN/L)\log_2 N$. In contrast, using the disclosed techniques to search for one preamble or to search for 'M' preambles simultaneously has a MAC complexity of $(2N/L)(1+\log_2 N)$.

It should be appreciated that the illustrated complexity comparison only accounts for the initial detection process. Traditional time-domain and frequency-domain correlation approaches require little additional processing for making a detection decision. The disclosed techniques are well suited for detecting the presence of a preamble symbol. However, further processing may be required to identify the actual preamble symbol, especially when two or more preamble symbols use the same set of subcarriers.

Figure 7:
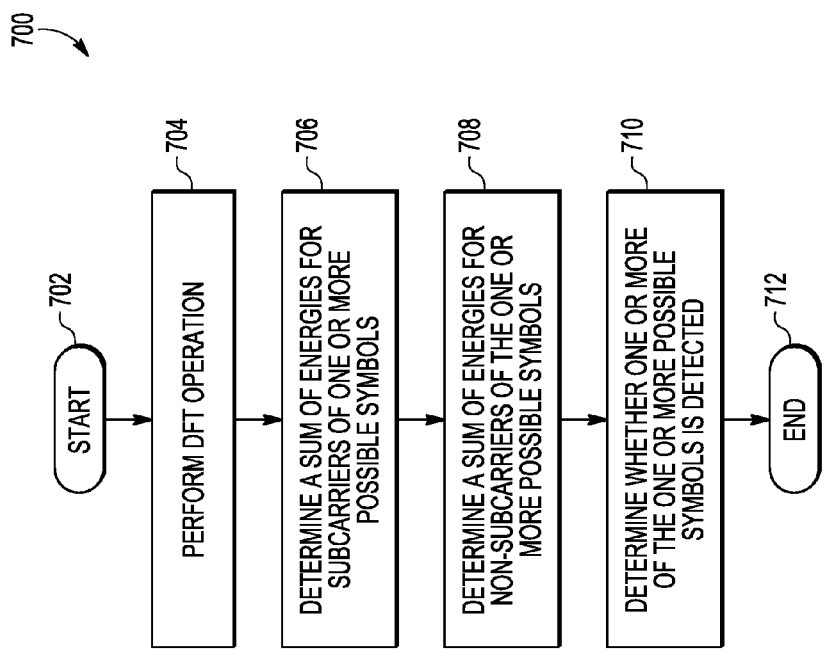
FIG. 7 is a flowchart of a process for over-sized DFT symbol detection according to an embodiment of the present invention.

With reference to FIG. 7, a process 700 for detecting symbols in a communication system using over-sized discrete Fourier transforms is illustrated. The process 700 is initiated in block 702 in response to, for example, receiver 208 receiving a signal. Next, in block 704, the detector 203 performs a discrete Fourier transform (DFT) operation (e.g., an FFT operation) on the received signal, which includes multiple repeated symbols. For example, if 'N' is a size of the repeated symbol, the symbol is repeated 'K' times, 'K' is greater than or equal to two, 'P' is less than or equal to 'K' and greater than or equal to two, the DFT operation may be a PN-DFT operation. As one example, if 'P' is equal to four, a 2N-DFT operation, and 3N-DFT operation, or a 4N-DFT operation may be performed. Next, in block 706, the detector 203 determines a sum of signal characteristics (e.g., energies) for subcarriers of one or more possible symbols based on the DFT operation. Then, in block 708, the detector 203 determines a sum of signal characteristics for non-subcarriers of the one or more possible symbols based on DFT operation. Finally, in block 710, the detector 203 determines whether one or more of the one or more possible symbols are detected based on the sum of signal characteristics for the subcarriers and sum of signal characteristics for the non-subcarriers.

Accordingly, techniques have been disclosed herein that advantageously detect symbols in a communication system using over-sized discrete Fourier transforms.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of detecting symbols by a receiver, comprising:

performing, by a receiver, an over-sized discrete Fourier transform (DFT) operation on a received signal that includes a repeated symbol that is repeated at least twice in an end-to-end manner;

determining, by the receiver, a first sum of signal characteristics for a first set of subcarriers based on the over-sized DFT operation, wherein the first set of subcarriers are assigned to one or more possible symbols for which detection is being attempted, and the repeated symbol is one of the one or more possible symbols;

determining, by the receiver, a second sum of signal characteristics for a second set of subcarriers based on the over-sized DFT operation, wherein the second set of subcarriers are not assigned to the one or more possible symbols;

determining, by the receiver, a ratio of the first sum of signal characteristics to the second sum of signal characteristics; and comparing, by the receiver, the ratio to one or more thresholds; and detecting, by the receiver, the received repeated symbol of the one or more possible symbols in response to the ratio exceeding at least one of the one or more thresholds.

2. The method of claim 1, further comprising:

demodulating, by the receiver, the received repeated symbol in response to the detecting the received repeated symbol.

3. The method of claim 1, wherein the one or more possible symbols are defined according to a communication standard.

4. The method of claim 1, wherein each of the one or more possible symbols employ a different set of subcarriers.

5. The method of claim 1, wherein
at least two of the one or more possible symbols employ a same set of subcarriers, and
the at least two of the one or more possible symbols are different symbols.

6. The method of claim 1, wherein the repeated symbol is an orthogonal frequency-division multiplexing (OFDM) symbol or discrete multi-tone (DMT) symbol.

7. The method of claim 1, wherein the signal characteristics correspond to signal energies or signal amplitudes.

8. The method of claim 1, wherein the over-sized DFT is a fast Fourier transform (FFT).

9. The method of claim 1, wherein 'N' is a size of the repeated symbol, the repeated symbol is repeated 'K' times, 'K' is greater than or equal to two, 'P' is less than or equal to 'K' and greater than or equal to two, and the over-sized DFT operation is a PN-DFT operation.

10. The method of claim 1, wherein the one or more possible symbols include preamble symbols defined by one or more of G3-PLC, PRIME, IEEE 1901.2, ANSI/EIA 709.1, 709.2, KNX, and IEC61334.

11. The method of claim 1, wherein the second set of subcarriers are provided by the over-sized DFT operation and correspond to in-band subcarriers that result from the over-sized DFT operation that are not associated with the one or more possible symbols.

12. A receiver, comprising:
receiving components to receive a signal; and
a preamble detector, coupled to the receiving components, the preamble detector is configured to perform an over-sized discrete Fourier transform (DFT) operation on the received signal that includes a repeated symbol that is repeated at least twice in an end-to-end manner,
determine a first sum of energies for a first set of subcarriers based on the over-sized DFT operation, wherein the first set of subcarriers are assigned to one or more possible symbols for which detection is being attempted, and the repeated symbol is one of the one or more possible symbols,
determine a second sum of energies for a second set of subcarriers based on the over-sized DFT operation, wherein the second set of subcarriers are not assigned to the one or more possible symbols,
determine a ratio of the first sum of energies to the second sum of energies,
compare the ratio to one or more thresholds, and
detect the received repeated symbol of the one or more possible symbols in response to the ratio exceeding at least one of the one or more thresholds.

13. The receiver of claim 12, wherein the repeated symbol is an orthogonal frequency-division multiplexing (OFDM) symbol or discrete multi-tone (DMT) symbol.

14. The receiver of claim 12, wherein 'N' is a size of the repeated symbol, the repeated symbol is repeated 'K' times, 'K' is greater than or equal to two, 'P' is less than or equal to 'K' and greater than or equal to two, and the over-sized DFT operation is a PN-DFT operation.

15. The receiver of claim 12, further comprising:
a demodulator coupled to the preamble detector, wherein the demodulator is configured to demodulate the received repeated symbol in response to detection of the received repeated symbol.

16. A meter, comprising:
a receiver including a detector configured to
perform an over-sized discrete Fourier transform (DFT) operation on a received signal that includes a repeated symbol that is repeated at least twice in an end-to-end manner,
determine a first sum of energies for a first set of subcarriers based on the over-sized DFT operation, wherein the first set of subcarriers are assigned to one or more possible symbols for which detection is being attempted, and the repeated symbol is one of the one or more possible symbols,
determine a second sum of energies for a second set of subcarriers based on the over-sized DFT operation, wherein the second set of subcarriers are not assigned to the one or more possible symbols,
determine a ratio of the first sum of energies to the second sum of energies, and
compare the ratio to one or more thresholds, wherein the received repeated symbol of the one or more possible symbols is detected in response to the ratio exceeding at least one of the one or more thresholds; and
a differential demodulator coupled to the detector, wherein the demodulator is configured to demodulate the received repeated symbol.

17. The meter of claim 16, further comprising:
a decoder coupled to the differential demodulator, wherein the decoder is configured to decode a demodulated the detected one of the one or more possible symbols.

18. The meter of claim 17, wherein a different symbol is mapped to a same set of subcarriers for each of at least two of the one or more possible symbols.

19. The meter of claim 16, wherein the meter is configured to measure electricity.

20. The meter of claim 16, wherein the second set of subcarriers are provided by the over-sized DFT operation and correspond to in-band subcarriers that result from the over-sized DFT operation that are not associated with the one or more possible symbols.

* * * * *